US011816908B2

(12) United States Patent
Tang et al.

(10) Patent No.: US 11,816,908 B2
(45) Date of Patent: Nov. 14, 2023

(54) METHOD OF GENERATING FONT DATABASE, AND METHOD OF TRAINING NEURAL NETWORK MODEL

(71) Applicant: Beijing Baidu Netcom Science Technology Co., Ltd., Beijing (CN)

(72) Inventors: Licheng Tang, Beijing (CN); Jiaming Liu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/683,514

(22) Filed: Mar. 1, 2022

(65) Prior Publication Data
US 2022/0180650 A1    Jun. 9, 2022

(30) Foreign Application Priority Data

Apr. 20, 2021   (CN) .......................... 202110427857.1

(51) Int. Cl.
*G06V 30/244*    (2022.01)
*G06V 10/774*    (2022.01)
*G06V 10/74*    (2022.01)
*G06V 10/82*    (2022.01)

(52) U.S. Cl.
CPC .......... *G06V 30/245* (2022.01); *G06V 10/761* (2022.01); *G06V 10/7747* (2022.01); *G06V 10/82* (2022.01); *G06V 30/2455* (2022.01)

(58) Field of Classification Search
None
See application file for complete search history.

(56) References Cited

FOREIGN PATENT DOCUMENTS

| CN | 106384094 A | 2/2017 |
|---|---|---|
| CN | 106611172 A | 5/2017 |
| CN | 110009027 A | 7/2019 |
| CN | 110111243 A | 8/2019 |
| CN | 111079374 | * 4/2020 |
| CN | 111079374 A | 4/2020 |
| CN | 112001416 A | 11/2020 |
| JP | 2019-028094 A | 2/2019 |

(Continued)

OTHER PUBLICATIONS

Machine translation of Peijiang et al (CN 111079374), pp. 1-23, Apr. 2023 (Year: 2023).*

(Continued)

*Primary Examiner* — Edward Park
(74) *Attorney, Agent, or Firm* — KEATING & BENNETT, LLP

(57) ABSTRACT

A method of generating a font database, and a method of training a neural network model are provided, which relate to a field of artificial intelligence, in particular to a computer vision and deep learning technology. The method of generating the font database includes: determining, by using a trained similarity comparison model, a basic font database most similar to handwriting font data of a target user in a plurality of basic font databases as a candidate font database; and adjusting, by using a trained basic font database model for generating the candidate font database, the handwriting font data of the target user, so as to obtain a target font database for the target user.

16 Claims, 7 Drawing Sheets

100

A basic font database most similar to handwriting font data of a target user is determined as a candidate font database by using a trained similarity comparison model — S110

The handwriting font data of the target user is adjusted by using a trained basic font database model for generating the candidate font database — S120

(56) References Cited

FOREIGN PATENT DOCUMENTS

JP  2019028094  *  2/2019

OTHER PUBLICATIONS

Machine translation of Peertech et al (JP 2019028094), pp. 1-11, Apr. 2023 (Year: 2023).*
Lian et al, "EasyFont: A Style Learning-Based System to Easily Build Your Large-Scale Handwriting Fonts", Feb. 2019, ACM, vol. 38, issue 1, pp. 1-18 (Year: 2019).*
Official Communication issued in corresponding European Patent Application No. 22159420.3, dated Sep. 2, 2022.
Lian et al., "EasyFont: A Style Learning-Based System to Easily Build Your Large-Scale Handwriting Fonts", ACM Transactions on Graphics, vol. 38, No. 1, Dec. 14, 2018, 18 pages.
Official Communication issued in corresponding Chinese Patent Application No. 202110427857.1, dated May 11, 2023.
Official Communication issued in corresponding Chinese Patent Application No. 202110427857.1, dated Sep. 12, 2023.

* cited by examiner

100

A basic font database most similar to handwriting font data of a target user is determined as a candidate font database by using a trained similarity comparison model — S110

The handwriting font data of the target user is adjusted by using a trained basic font database model for generating the candidate font database — S120

300

```
┌─────────────────────────────────────────────────────────────┐
│ A basic font database most similar to handwriting font data of a │
│ target user is determined as a candidate font database by using a │── S310
│          trained similarity comparison model                 │
└─────────────────────────────────────────────────────────────┘
                              │
                              ▼
┌─────────────────────────────────────────────────────────────┐
│ The handwriting font data of the target user is adjusted by using a │
│ trained basic font database model for generating the candidate │── S320
│                       font database                          │
└─────────────────────────────────────────────────────────────┘
                              │
                              ▼
┌─────────────────────────────────────────────────────────────┐
│   Radical data in the target font database is replaced with │
│  corresponding radical data of the handwriting font data of the │── S330
│                         target user                          │
└─────────────────────────────────────────────────────────────┘
```

FIG. 3

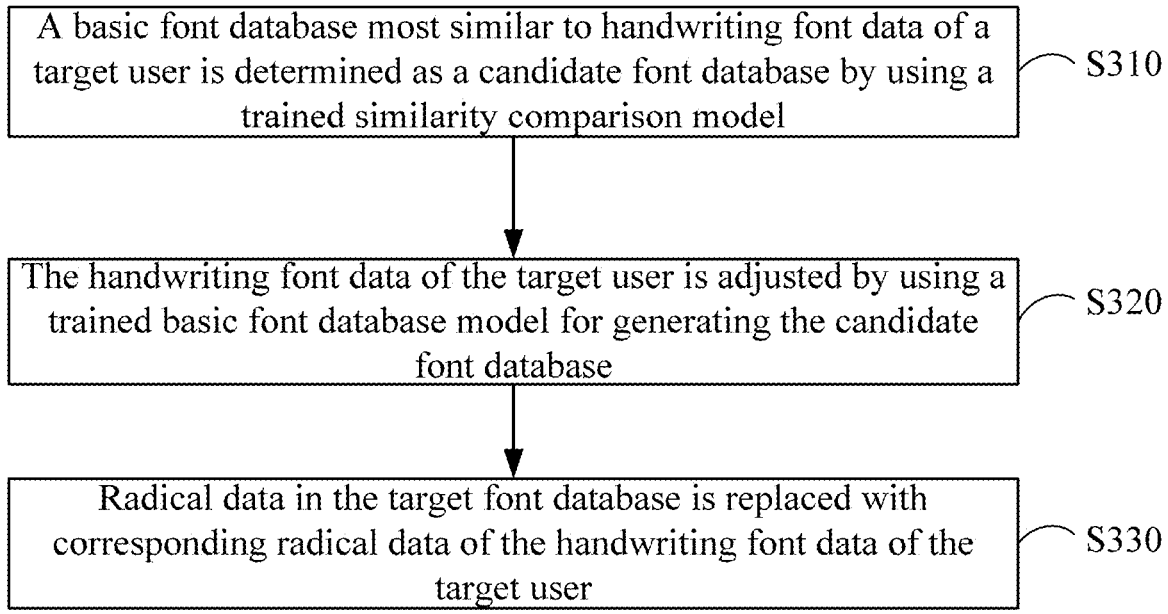

METHOD OF GENERATING FONT DATABASE, AND METHOD OF TRAINING NEURAL NETWORK MODEL

CROSS-REFERENCE TO RELATED APPLICATION

This application claims the benefit of Chinese Patent Application No. 202110427857.1 filed on Apr. 20, 2021, the whole disclosure of which is incorporated herein by reference.

TECHNICAL FIELD

The present disclosure relates to a field of artificial intelligence, in particular to a computer vision and deep learning technology, and especially to a method of generating a font database, and a method of training a neural network model.

BACKGROUND

A font generation has always been a focus of many researchers at home and abroad, and has a wide application value in a font design industry. A current main technical scheme includes a deep learning-based font generation scheme and a font generation scheme of decomposing and then recomposing fonts.

The deep learning-based font generation scheme, especially a generative adversarial network (GAN)-based font generation scheme needs a large amount of data for training. A data quality and a data quantity may affect a final output effect, so a high requirement is proposed for a training data acquisition and the data quality. The font generation scheme of decomposing and then recomposing fonts needs a smaller amount of data than the GAN-based font generation scheme, but it is difficult to reproduce a joined-up writing characteristic of a user font, which may result in a lack of aesthetics and diversity of the user font.

SUMMARY

The present disclosure provides a method of generating a font database, a method of training a neural network model, a device, and a storage medium.

According to one aspect, there is provided a method of generating a font database, including:
determining, by using a trained similarity comparison model, a basic font database most similar to handwriting font data of a target user in a plurality of basic font databases as a candidate font database; and
adjusting, by using a trained basic font database model for generating the candidate font database, the handwriting font data of the target user, so as to obtain a target font database for the target user.

According to another aspect, there is provided a method of training a neural network model including a basic font database model and a similarity comparison model, including:
training the basic font database model using handwriting font data of a plurality of users, so that each user of the plurality of users has a corresponding basic font database model and a corresponding basic font database; and
training the similarity comparison model using a plurality of basic font databases of the plurality of users.

According to another aspect, there is provided an electronic device, including:
at least one processor; and
a memory communicatively connected to the at least one processor, the memory stores instructions executable by the at least one processor, and the instructions, when executed by the at least one processor, cause the at least one processor to implement the method described above.

According to another aspect, there is provided a non-transitory computer-readable storage medium having computer instructions stored thereon, the computer instructions allow a computer to implement the method described above.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to understand the solution better and do not constitute a limitation to the present disclosure.

FIG. 3 shows a flowchart of a method of generating a font database according to another embodiment of the present disclosure.

FIG. 4 shows a schematic diagram of adjusting a position of a centroid of radical image data according to an embodiment of the present disclosure.

DETAILED DESCRIPTION OF EMBODIMENTS

Exemplary embodiments of the present disclosure will be described below with reference to the accompanying drawings, which include various details of the embodiments of the present disclosure to facilitate understanding, and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

Figures 1, 2:
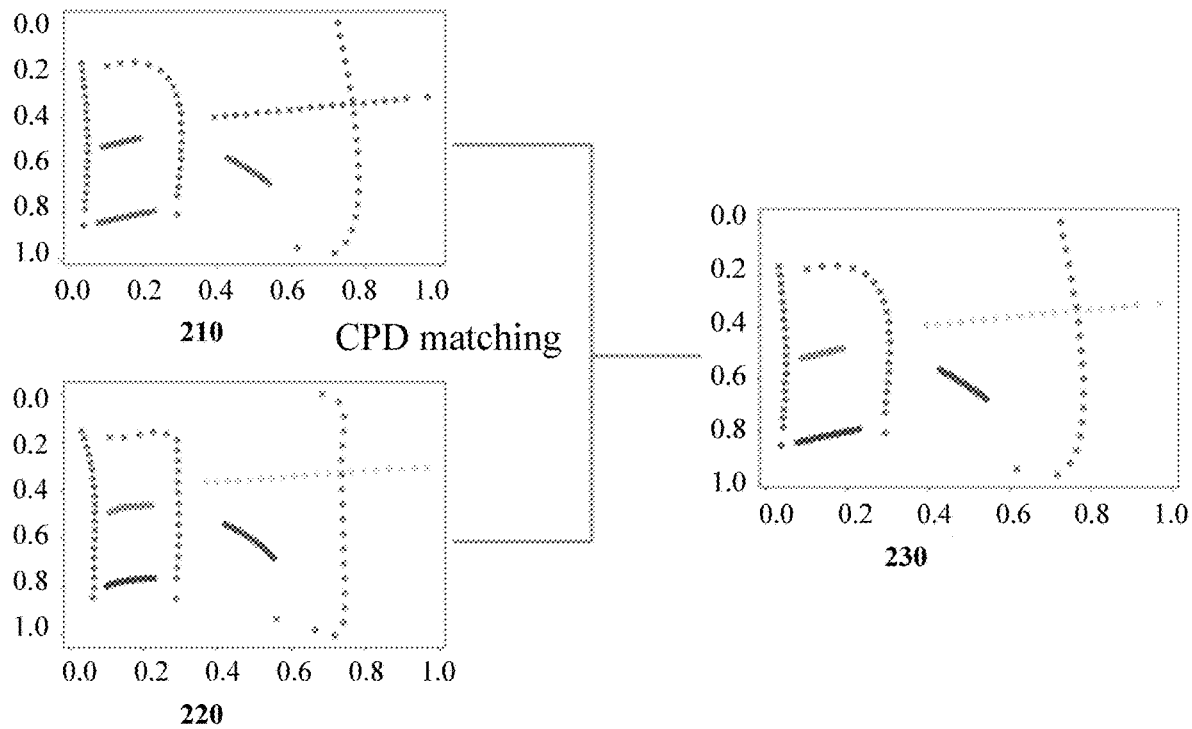
FIG. 1 shows a flowchart of a method of generating a font database according to an embodiment of the present disclosure.
FIG. 2 shows an effect of segmenting a user's handwritten word using a coherent point drift (CPD) matching algorithm according to an embodiment of the present disclosure.

FIG. 1 shows a flowchart of a method 100 of generating a font database according to an embodiment of the present disclosure.

In step S110, a basic font database most similar to handwriting font data of a target user in a plurality of basic font databases is determined as a candidate font database by using a trained similarity comparison model.

In some embodiments, a similarity between the handwriting font data of the target user and corresponding font data in each basic font database of the plurality of basic font databases may be determined, and a basic font database with a greatest similarity in the plurality of basic font databases may be determined as the candidate font database.

In some embodiments, the similarity may include a sum of similarities between a plurality of handwriting font data of the target user and a plurality of corresponding font data in each basic font database of the plurality of basic font databases.

For example, in a case that the similarity comparison model is pre-trained using N (N is a natural number greater than 1) basic font databases, if the target user (e.g., a new user) inputs 100 handwritten words, font data of the 100 handwritten words may be input into the trained similarity comparison model respectively with 100 corresponding font data in each basic font database. The similarity comparison model may output a probability $p_{ij}$ (i=1, 2, . . . , N; j=1, 2, . . . , 100) of the font data for comparison being similar to the corresponding font data in each basic font database. Hereinafter, the probability of fonts being similar to each other is called a similarity. In some embodiments, by calculating a sum of similarities between the font data of the 100 handwritten words input by the target user and the corresponding font data in the basic font database, the basic font database most similar to the handwriting font data of the target user may be obtained as follows.

$$I = \mathrm{argmax}_{(i=1,2,\ldots,N)}(\Sigma_{j=1}^{100} p_{ij}) \quad (1)$$

The basic font database most similar to the handwriting font data of the target user may be determined as the candidate font database.

In step S120, the handwriting font data of the target user is adjusted by using a trained basic font database model for generating the candidate font database, so as to obtain a target font database for the target user.

In some embodiments, a basic stroke of a standard font is used as an input of the trained basic font database model for generating the candidate font database, and a basic stroke of the handwriting font of the target user is used as an output of the trained basic font database model for generating the candidate font database. In some embodiments, the basic stroke of the handwriting font of the target user is obtained by segmenting a handwritten word of the target user using a coherent point drift CPD matching algorithm.

FIG. 2 shows an effect of segmenting a user's handwritten word using a coherent point drift (CPD) matching algorithm according to an embodiment of the present disclosure.

As shown in FIG. 2, 210 represents a handwritten word input by the user, and 220 represents a standard KaiTi word. The user's handwritten word and the standard KaiTi word may be matched by CPD to obtain a matching result 230.

In some embodiments, the matching result 230 obtained using the CPD matching algorithm may be filtered, so as to remove a result determined to be incorrect.

The embodiments of the present disclosure may be implemented to generate a target font database for the target user by using the pre-trained basic font database model, so that the target user may obtain a stable font database model by providing a small amount of handwriting font data. The method of generating the font database according to the embodiments of the present disclosure has a simple training process, a few processing steps and a high model development efficiency.

FIG. 3 shows a flowchart of a method 300 of generating a font database according to another embodiment of the present disclosure.

Steps S310 and S320 in the method 300 are identical with steps S110 and S120 described with reference to FIG. 1. Repeated descriptions of steps S310 and S320 will be omitted here for conciseness.

The method 300 may further include step S330. In step S330, radical data in the target font database is replaced with corresponding radical data of the handwriting font data of the target user.

In some embodiments, a difference between a position of a centroid of radical image data after the replacing and a position of a centroid of radical image data before the replacing may be calculated, and a position of the radical image data after the replacing may be adjusted based on the difference.

FIG. 4 shows a schematic diagram of adjusting a position of a centroid of radical image data according to an embodiment of the present disclosure.

Referring to FIG. 4, a bounding box 410 (x, y, w, h) formed by all strokes (hereinafter referred to as "strokes" for conciseness) of a radical image S1 (e.g., a radical "扌" shown in FIG. 4) corresponding to specific font data in the target font database is calculated, where x, y represents x-y axis coordinates of a position of the bounding box 410, w represents a width of the bounding box, and h represents a height of the bounding box. Then, a common centroid $p_1$ of all strokes of the radical image S1 (that is, a centroid of the radical image S1) may be calculated. A radical image S2 of the same type as the radical image S1 may be segmented from a font image corresponding to the font data input by the target user, and the radical image S2 may be used to replace the radical image S1 and placed in the bounding box 410 (x, y, w, h).

In some embodiments, a difference between a position of a centroid of the radical image S2 after the replacing and the position of a centroid of the radical image S1 before the replacing may be calculated, and a position of the radical image S2 after the replacing may be adjusted based on the difference. Specifically, a common centroid $p_2$ of all strokes of the radical image S2 (that is, the centroid $p_2$ of the radical image S2) may be calculated, and a difference between the centroid $p_2$ of the radical image S2 and the centroid $p_1$ of the radical image S1 may be calculated to obtain a difference (dx, dy) between the centroids of the two. The bounding box 310 (x, y, w, h) may be moved to (x+dx, y+dy, w, h) based on the difference (dx, dy), so that the centroid $p_2$ of the radical image S2 is aligned with the centroid $p_1$ of the radical image S1.

The embodiments of the present disclosure may be implemented to further reflect a font style of the user by replacing the radical data in the target font database with the corresponding radical data of the handwriting font data of the target user. Furthermore, the radical image after the replacing may be more harmonious with other parts of an original word image by adjusting the position of the radical image after the replacing based on an alignment of centroid.

Figure 5:
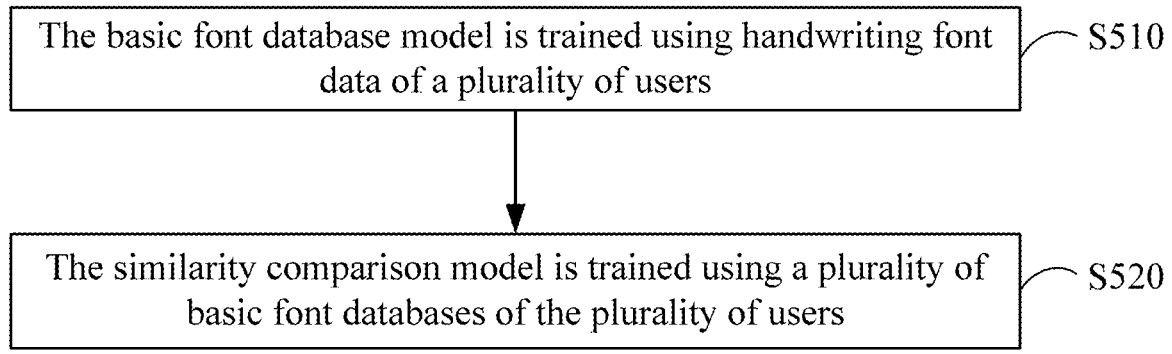
FIG. 5 shows a flowchart of a method of training a neural network model according to an embodiment of the present disclosure.

FIG. 5 shows a flowchart of a method 500 of training a neural network model according to an embodiment of the present disclosure. The neural network model includes a basic font database model and a similarity comparison model.

In step S510, the basic font database model is trained using handwriting font data of a plurality of users, so that each user of the plurality of users has a corresponding basic font database model and a corresponding basic font database. An input of the basic font database model is a basic stroke of a standard font (for example, a standard KaiTi font), and an output is a basic stroke of the handwriting font of each user of the plurality of users.

In step S520, the similarity comparison model is trained using a plurality of basic font databases of the plurality of users. The similarity comparison model may compare a similarity between two or more font image data.

Figure 6:
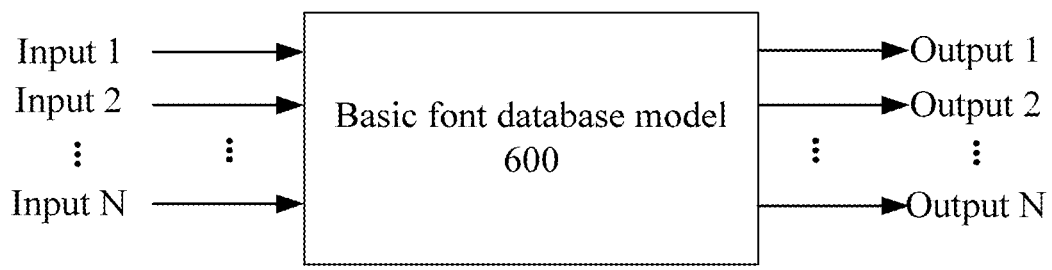
FIG. 6 shows a schematic diagram of a model structure of a basic font database model according to an embodiment of the present disclosure.

FIG. 6 shows a schematic diagram of a model structure of a basic font database model 600 according to an embodiment of the present disclosure.

Referring to FIG. 6, the basic font database model 600 is trained with a basic stroke of the standard font (e.g., a standard KaiTi font) as an input and a basic stroke of the handwriting font of each user of the plurality of users as an output. For example, the input may be input 1, input 2 . . . input N shown in FIG. 6, and the output may be output 1, output 2 . . . output N shown in FIG. 6.

In some embodiments, the basic stroke of the handwriting font of each user of the plurality of users may be obtained by segmenting a handwritten word of the user using a coherent point drift CPD matching algorithm. An effect of segmenting the handwritten word of the target user using the CPD matching algorithm is shown in FIG. 2.

In some embodiments, a matching result obtained using the CPD matching algorithm may be filtered, so as to remove a result determined to be incorrect.

Specifically, a 20-point uniform sampling is performed on each basic stroke obtained by segmenting using CPD matching algorithm, and a center point $(X_c, Y_c)$ of the 20 points may be calculated. Then, a difference between coordinates of each point of the 20 points and coordinates of the center point is calculated to obtain a deviation value $(X_i-X_c, Y_i-Y_c)$ of each point with respect to the center point, where i represents an index of the point. In addition, a category of the basic stroke obtained by segmenting using the CPD matching algorithm may be determined. Here, taking Chinese characters as an example, all strokes of Chinese characters may be classified into 30 basic strokes including a horizontal stroke, a vertical stroke, a dot stroke, a left-falling stroke, a right-falling stroke, etc. That is, it may be further determined which of the 30 basic strokes the basic stroke obtained by segmenting using the CPD matching algorithm belongs to. Finally, the input for the basic font database model 600 (that is, the basic stroke of the standard font) may be obtained, which is a feature vector with a dimension of 20*2+30=70. Here, taking 20-point sampling as an example, each point is represented by coordinates (x, y), which correspond to 20*2 dimensions, and 30 dimensions correspond to 30 types of basic strokes. The output of the basic font database model 600 is the basic stroke of the handwriting font of each user of the plurality of users.

According to the embodiments of the present disclosure, because the input and the output of the basic font database model 600 have identical sequence length, a decoder part may be omitted, and only an encoder structure in the model 600 is used as a main body of the model, so that a size of the model may be reduced.

Figure 7:
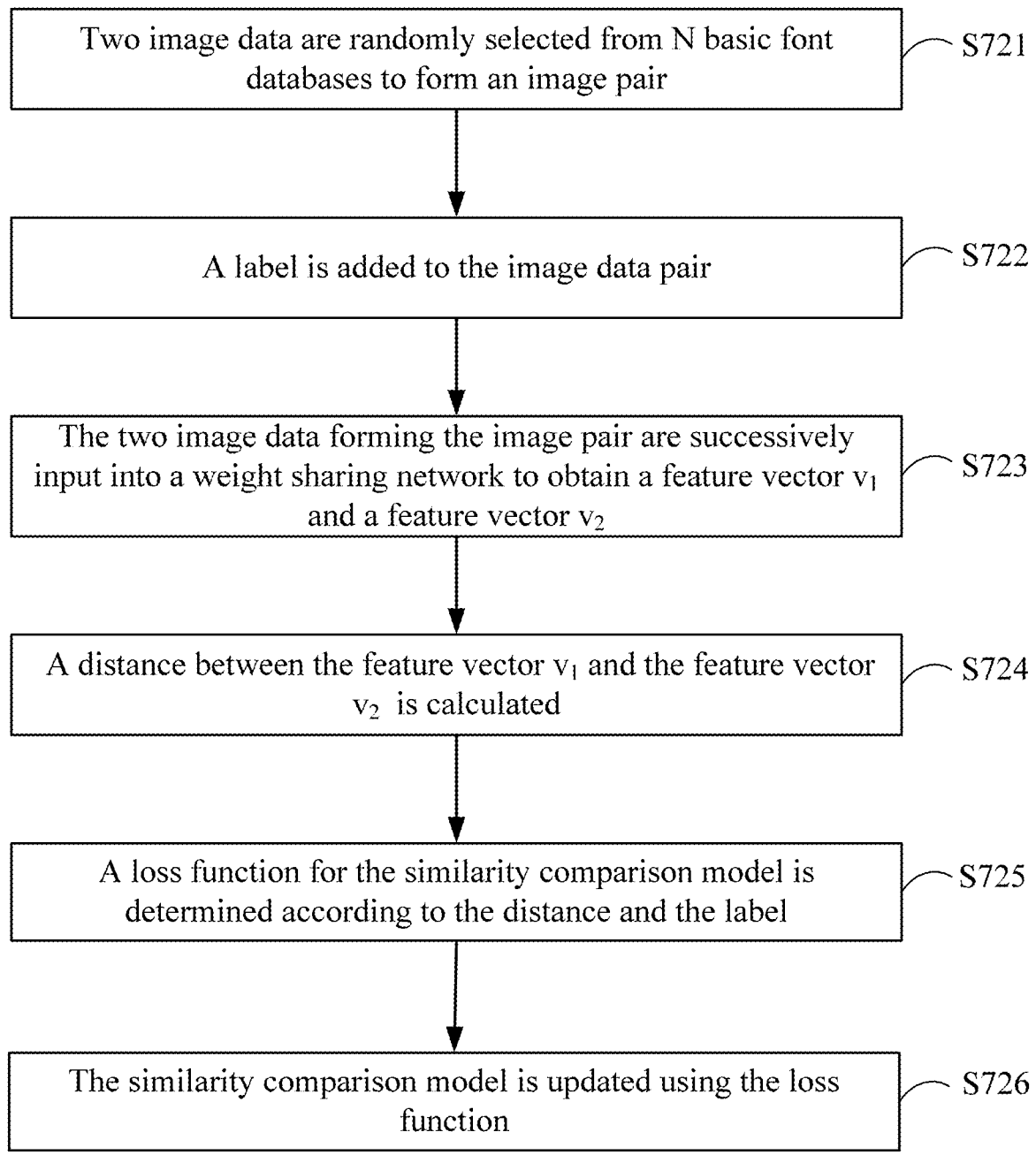
FIG. 7 shows a flowchart of a method of training a similarity comparison model according to an embodiment of the present disclosure.

FIG. 7 shows a flowchart of a method of training a similarity comparison model according to an embodiment of the present disclosure. The similarity comparison model may compare a similarity between two or more font data.

In step S721, two image data are randomly selected from N basic font databases in the plurality of basic font databases to form an image pair, where the N basic font databases are represented by an array $\{X_1\}$, (i=1, 2, . . . , N), and N is a natural number greater than 1.

In step S722, a label is added to the image data pair, a value of 1 is assigned to the label in response to determining that the image data pair is formed by two image data selected from the same basic font database, and a value of 0 is assigned to the label in response to determining that the image data pair is formed by two image data selected from different basic font databases.

In step S723, the two image data forming the image pair are successively input into a weight sharing network to obtain a feature vector $v_1$ and a feature vector $v_2$ respectively representing image features of the two image data.

In step S724, a distance between the feature vector $v_1$ and the feature vector $v_2$ is calculated.

In step S725, a loss function for the similarity comparison model is determined according to the distance and the label.

In step S726, the similarity comparison model is updated using the loss function.

Figures 8, 9:
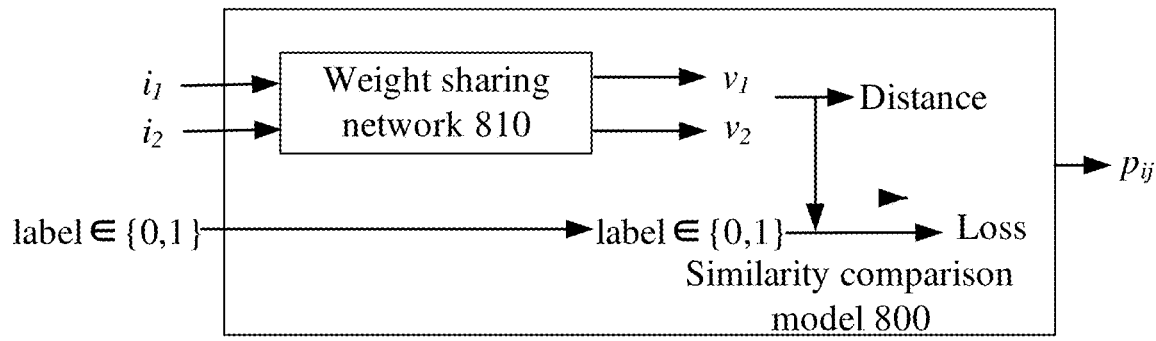
FIG. 8 shows a schematic diagram of a model structure of a similarity comparison model according to an embodiment of the present disclosure.
FIG. 9 shows a schematic diagram of an effect of generating a font database according to an embodiment of the present disclosure.

FIG. 8 shows a schematic diagram of a model structure of a similarity comparison model 800 according to an embodiment of the present disclosure.

Referring to FIG. 8, a label is added to the image data pair formed by two image data $i_1$ and $i_2$, a value of 1 is assigned to the label when determining that the image data pair is formed by two image data selected from the same basic font database, and a value of 0 is assigned to the label when determining that the image data pair is formed by two image data from different basic font databases.

The two image data $i_1$ and $i_2$ forming the image pair may be input into a weight sharing network 810 to obtain an output feature 1 and an output feature 2. The weight sharing network 810 may include, for example, a convolutional neural network and a fully connected layer (CNN & FC). For example, the output feature 1 may be the feature vector $v_1$ for the image data $i_1$, and the output feature 2 may be the feature vector $v_2$ for the image data $i_2$. Then, a Distance between the feature vector $v_1$ and the feature vector $v_2$ may be calculated.

A loss function Loss($i_1$, $i_2$, label) for the similarity comparison model 800 may be obtained according to the Distance and the label, and the loss function Loss($i_1$, $i_2$, label) may be expressed as follows.

$$\text{Loss}(i_1,i_2,\text{label})=(1-\text{label})*(1-\text{metric}(v_1,v_2))+ \\ \text{label}*\text{metric}(v_1,v_2) \quad (2)$$

where $i_1$ and $i_2$ respectively represent two image data, and metric represents a Euclidean distance. The loss function Loss may be used to update the similarity comparison model 800. The output of the similarity comparison model 800 may include a probability of the input two image data being similar to each other, that is, a probability $p_{ij}$ (i=1, 2, . . . , N; j=1, 2, . . . , 100) of the two image data belonging to one of the N basic font databases.

FIG. 9 shows a schematic diagram of an effect of generating a font database according to an embodiment of the present disclosure. As shown in FIG. 9, by replacing the radical data in the target font database with the corresponding radical data of the handwriting font data of the target user, joined-up strokes and joined-up radicals in the user's handwritten word may be retained well, so that the font style of the user's handwriting may be further reflected.

Figure 10:
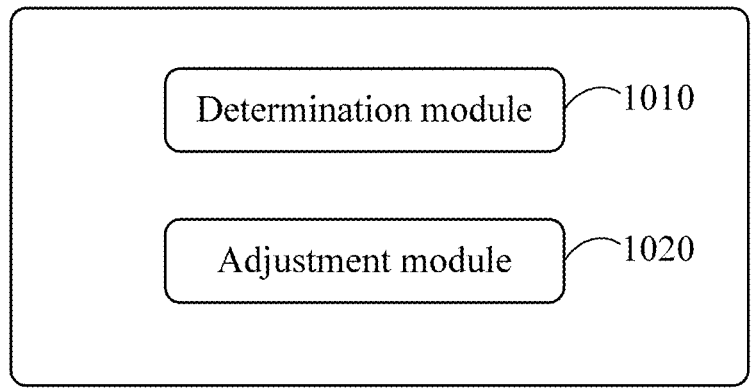
FIG. 10 shows a block diagram of an apparatus of generating a font database according to an embodiment of the present disclosure.

FIG. 10 shows a block diagram of an apparatus 1000 of generating a font database according to an embodiment of the present disclosure.

As shown in FIG. 10, the apparatus 1000 of generating the font database includes a determination module 1010 and an adjustment module 1020.

The determination module 1010 is used to compare, by using a trained similarity comparison model, handwriting font data of a target user with a plurality of basic font databases, so as to determine a basic font database most similar to the handwriting font data of the target user in the plurality of basic font databases as a candidate font database.

The adjustment module 1020 is used to adjust, by using a trained basic font database model for generating the candidate font database, the handwriting font data of the target user, so as to obtain a target font database for the target user.

Figure 11:
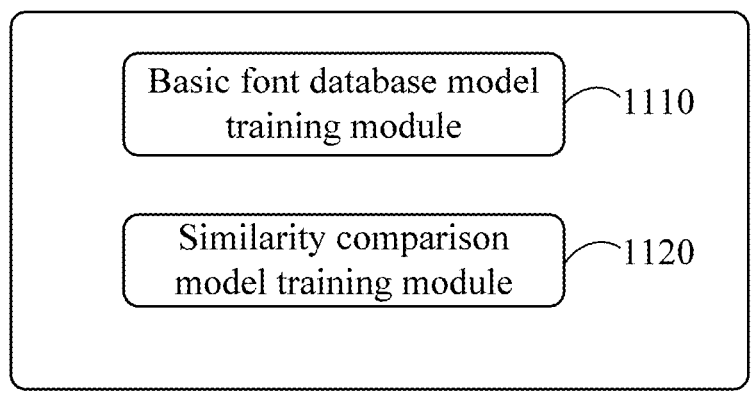
FIG. 11 shows a block diagram of an apparatus of training a neural network model according to an embodiment of the present disclosure.

FIG. 11 shows a block diagram of an apparatus 1100 of training a neural network model according to an embodiment of the present disclosure. The neural network model includes a basic font database model and a similarity comparison model.

As shown in FIG. 11, the apparatus 1100 includes a basic font database model training module 1110 and a similarity comparison model training module 1120.

The basic font database model training module 1110 is used to train the basic font database model using handwriting font data of a plurality of users, so that each user of the plurality of users has a corresponding basic font database model and a corresponding basic font database.

The similarity comparison model training module 1120 is used to train the similarity comparison model using a plurality of basic font databases of the plurality of users.

In the technical solution of the present disclosure, authorization or consent is obtained from the user before the user's personal information is obtained or collected.

According to the embodiments of the present disclosure, the present disclosure further provides an electronic device, a readable storage medium, and a computer program product.

Figure 12:
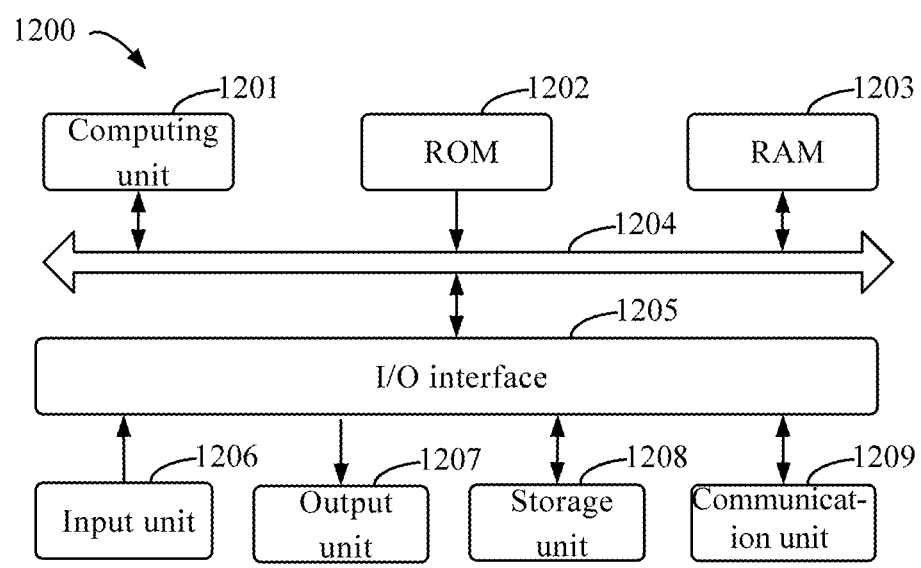
FIG. 12 shows a block diagram of an electronic device for implementing the embodiments of the present disclosure.

FIG. 12 shows a block diagram of an electronic device 1200 for implementing the embodiments of the present disclosure. The electronic device 1200 is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 12, the electronic device 1200 may include a computing unit 1201, which may perform various appropriate actions and processing based on a computer program stored in a read-only memory (ROM) 1202 or a computer program loaded from a storage unit 1208 into a random access memory (RAM) 1203. Various programs and data required for the operation of the electronic device 1200 may be stored in the RAM 1203. The computing unit 1201, the ROM 1202 and the RAM 1203 are connected to each other through a bus 1204. An input/output (I/O) interface 1205 is further connected to the bus 1204.

Various components in the electronic device 1200, including an input unit 1206 such as a keyboard, a mouse, etc., an output unit 1207 such as various types of displays, speakers, etc., a storage unit 1208 such as a magnetic disk, an optical disk, etc., and a communication unit 1209 such as a network card, a modem, a wireless communication transceiver, etc., are connected to the I/O interface 1205. The communication unit 1209 allows the electronic device 1200 to exchange information/data with other devices through a computer network such as the Internet and/or various telecommunication networks.

The computing unit 1201 may be various general-purpose and/or special-purpose processing components with processing and computing capabilities. Some examples of the computing unit 1201 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 1201 may perform the various methods and processes described above, such as the method of generating the font database and the method of training the neural network model. For example, in some embodiments, the method of generating the font database and the method of training the neural network model may be implemented as a computer software program that is tangibly contained on a machine-readable medium, such as the storage unit 1208. In some embodiments, part or all of a computer program may be loaded and/or installed on the electronic device 1200 via the ROM 1202 and/or the communication unit 1209. When the computer program is loaded into the RAM 1203 and executed by the computing unit 1201, one or more steps of the method of generating the font database and the method of training the neural network model described above may be performed. Alternatively, in other embodiments, the computing unit 1201 may be configured to perform the method of generating the font database and the method of training the neural network model in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

In the technical solution of the present disclosure, the collection, storage, use, processing, transmission, provision, disclosure, and application of user personal information involved comply with provisions of relevant laws and regulations, take essential confidentiality measures, and do not violate public order and good custom.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of generating a font database, comprising:
   determining, by using a trained similarity comparison model, a basic font database most similar to handwriting font data of a target user in a plurality of basic font databases as a candidate font database; and
   adjusting, by using a trained basic font database model for generating the candidate font database, the handwriting font data of the target user, so as to obtain a target font database for the target user, wherein
   the adjusting, by using the trained basic font database model for generating the candidate font database, the handwriting font data of the target user includes:
      using a basic stroke of a standard font as an input of the trained basic font database model for generating the candidate font database; and
      using a basic stroke of the handwriting font of the target user as an output of the trained basic font database model for generating the candidate font database; and
   the basic stroke of the handwriting font of the target user is obtained by segmenting a handwritten word of the target user using a coherent point drift (CPD) matching algorithm.

2. The method according to claim 1, wherein the determining a basic font database most similar to handwriting font data of a target user in a plurality of basic font databases as a candidate font database comprises:
   determining, by using the trained similarity comparison model, a similarity between the handwriting font data of the target user and corresponding font data in each basic font database of the plurality of basic font databases; and
   determining a basic font database with a greatest similarity in the plurality of basic font databases as the candidate font database.

3. The method according to claim 2, wherein the similarity comprises a sum of similarities between a plurality of handwriting font data of the target user and a plurality of corresponding font data in the each basic font database of the plurality of basic font databases.

4. The method according to claim 1, further comprising replacing radical data in the target font database with corresponding radical data of the handwriting font data of the target user.

5. The method according to claim 4, wherein the replacing radical data in the target font database with corresponding radical data of the handwriting font data of the target user comprises:
calculating a difference between a position of a centroid of radical image data after the replacing and a position of a centroid of radical image data before the replacing; and
adjusting, based on the difference, a position of the radical image data after the replacing.

6. The method according to claim 1, further comprising filtering a matching result obtained using the CPD matching algorithm, so as to remove a result determined to be incorrect.

7. An electronic device, comprising:
at least one processor; and
a memory communicatively connected to the at least one processor, wherein the memory stores instructions executable by the at least one processor, and the instructions, when executed by the at least one processor, cause the at least one processor to implement the method of claim 1.

8. The electronic device according to claim 7, wherein the at least one processor is further caused to:
determine, by using the trained similarity comparison model, a similarity between the handwriting font data of the target user and corresponding font data in each basic font database of the plurality of basic font databases; and
determine a basic font database with a greatest similarity in the plurality of basic font databases as the candidate font database.

9. The electronic device according to claim 8, wherein the similarity comprises a sum of similarities between a plurality of handwriting font data of the target user and a plurality of corresponding font data in the each basic font database of the plurality of basic font databases.

10. A non-transitory computer-readable storage medium having computer instructions stored thereon, wherein the computer instructions allow a computer to implement the method of claim 1.

11. A method of training a neural network model comprising a basic font database model and a similarity comparison model, comprising:
training the basic font database model using handwriting font data of a plurality of users, so that each user of the plurality of users has a corresponding basic font database model and a corresponding basic font database; and
training the similarity comparison model using a plurality of basic font databases of the plurality of users, wherein
the training the basic font database model using handwriting font data of a plurality of users includes:
using a basic stroke of a standard font as an input; and
using a basic stroke of a handwriting font of each user of the plurality of users as an output; and
the basic stroke of the handwriting font of each user of the plurality of users is obtained by segmenting a handwritten word of the user using a coherent point drift (CPD) matching algorithm.

12. The method according to claim 11, wherein the basic font data comprises font image data, and the training the similarity comparison model using a plurality of basic font databases of the plurality of users comprises:
selecting two image data randomly from N basic font databases in the plurality of basic font databases to form an image pair, where the N basic font databases are represented by an array $\{X_i\}$, (i=1, 2, ..., N), and N is a natural number greater than 1;
adding a label to the image data pair, wherein a value of 1 is assigned to the label in response to determining that the image data pair is formed by two image data selected from the same basic font database, and a value of 0 is assigned to the label in response to determining that the image data pair is formed by two image data selected from different basic font databases;
inputting the two image data into a weight sharing network successively to obtain a feature vector $v_1$ and a feature vector $v_2$ respectively representing image features of the two image data;
calculating a distance between the feature vector $v_1$ and the feature vector $v_2$;
determining a loss function for the similarity comparison model according to the distance and the label; and
updating the similarity comparison model using the loss function.

13. The method according to claim 12, wherein the loss function Loss($i_1$, $i_2$, label) for the similarity comparison model is expressed as $$\text{Loss}(i_1, i_2, \text{label}) = (1-\text{label})*(1-\text{metric}(v_1, v_2)) + \text{label}*\text{metric}(v_1, v_2)$$

where $i_1$ and $i_2$ represent the two image data, respectively, and metric represents a Euclidean distance.

14. The method according to claim 11, further comprising filtering a matching result obtained using the CPD matching algorithm, so as to remove a result determined to be incorrect.

15. An electronic device, comprising:
at least one processor; and
a memory communicatively connected to the at least one processor, wherein the memory stores instructions executable by the at least one processor, and the instructions, when executed by the at least one processor, cause the at least one processor to implement the method of claim 11.

16. A non-transitory computer-readable storage medium having computer instructions stored thereon, wherein the computer instructions allow a computer to implement the method of claim 11.

* * * * *